C. S. TOTTEN.
LATHE CENTER.
APPLICATION FILED MAY 13, 1908.
930,440.
Patented Aug. 10, 1909.
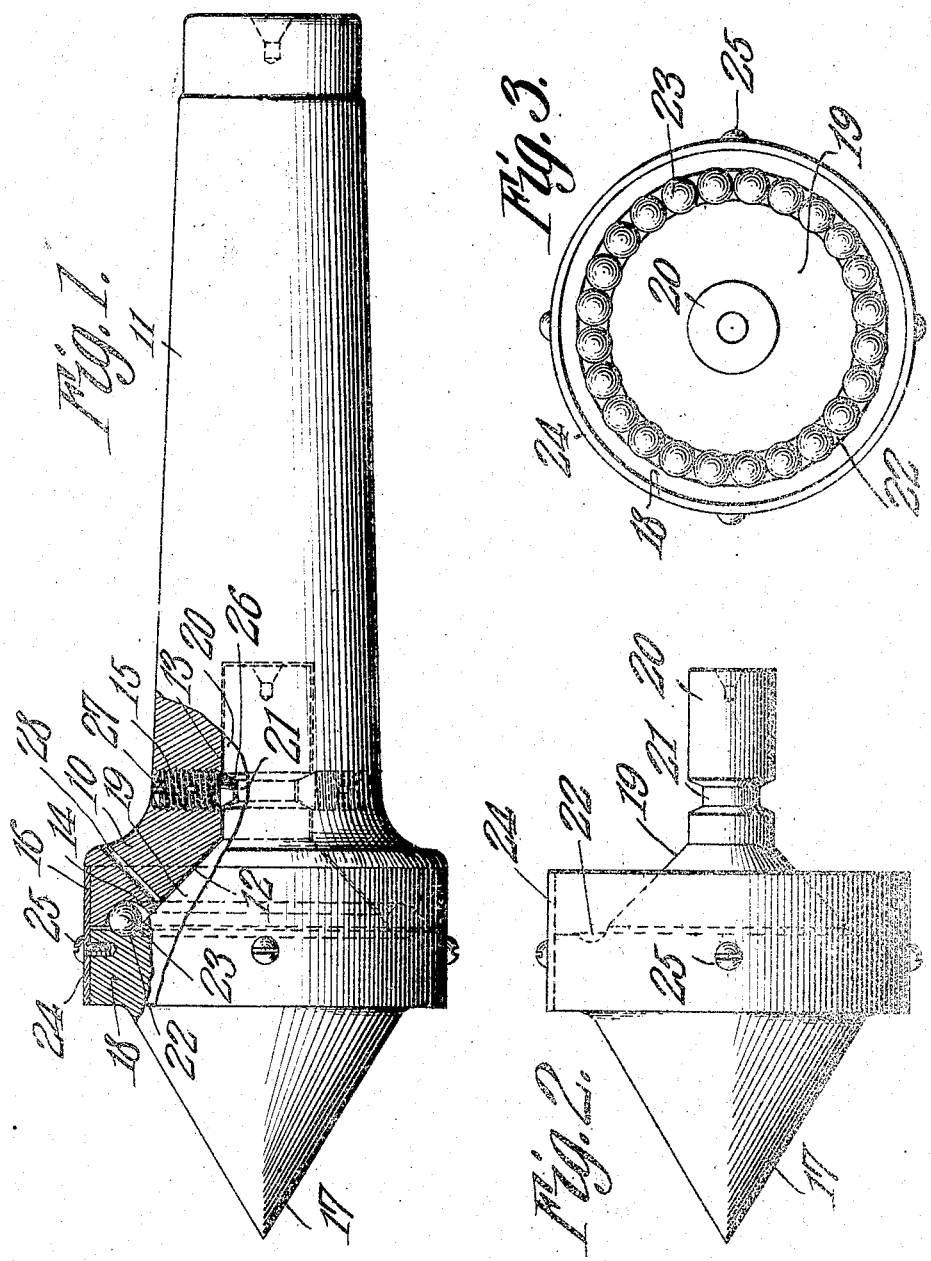

UNITED STATES PATENT OFFICE.

CLARK S. TOTTEN, OF PITTSFIELD, MASSACHUSETTS.

LATHE-CENTER.

No. 930,440.

Specification of Letters Patent.

Patented Aug. 10, 1909.

Application filed May 13, 1908. Serial No. 432,664.

*To all whom it may concern:*

Be it known that I, CLARK S. TOTTEN, a citizen of the United States, residing at Pittsfield, in the county of Berkshire and State of Massachusetts, have invented a new and useful Lathe-Center, of which the following is a specification.

This invention relates to lathe centers, and more to that commonly known as the dead center.

One object of the invention is to provide an improved general form of roller bearing dead center.

Another object of the invention is to provide a means of adjusting the movable parts of said centers with reference to the stationary parts.

The invention comprises a tapered shank arranged to be held within the back head of the lathe and a movable part mounted thereon of improved construction.

The invention further comprises such novel details of arrangement and combinations of parts, hereinafter fully described, illustrated in the accompanying drawings, and specifically set forth in the claims.

In the accompanying drawings, Figure 1 is an assembly of the device partly in sections. Fig. 2 is a view of the movable portion disconnected from the fixed portion. Fig. 3 is a view showing the arrangement of the balls.

The invention comprises a collet 10 provided with a taper shank 11, adapted to fit within the opening of a lathe center. The collet end is provided with a frusto-conical recess 12, and a cylindrical recess 13 leading therefrom. On the face of the collet and surrounding the frusto-conical recess is a ball race 14. There is further provided in the collet, one or more threaded lateral openings 15. Adjacent the face of the collet there is an annular rabbet 16.

The center proper is indicated at 17 and is of the usual conical form. A collar 18 is formed on the center and is of cylindrical shape. To the rear of the collar 18, there is a frusto-conical portion 19 of slightly smaller dimensions than the frusto-conical recess 12. This frusto-conical portion is extended rearwardly to form a shank 20 having a reduced portion 21, trapezoidal in cross section, the side walls of the reduced portion being preferably at an angle of 10° to each other. The center 17 is further provided with a ball race 22 surrounding the base of the frusto-conical portion 19. The ball races 14 and 22 are thus brought into juxtaposition and balls 23 are held within these races. The cylindrical portion 18 of the center is of substantially the same diameter as the rabbeted portion 16 of the collet. On the cylindrical portion 18 is mounted a ring 24, being held thereon by means of screws 25. Within each of the threaded openings 15, there is provided a set screw 26 the point of which is beveled to correspond with the angle of the reduced portion 21 of the center. There is further provided in the said openings a lock screw 27.

It is to be observed that the balls 23 are of such diameter that the portion of the centers designated which lie within the frusto-conical and cylindrical recess in the collet will be held free from said recess, being slightly spaced therefrom. For the purpose of oiling the device there is provided an oil hole 28 which opens into the space between the frusto-conical recess and the frusto-conical portion of the center. It is further to be observed that the threaded openings 15 are so positioned with reference to the reduced portion 21 of the center when it is in place that the screw 26 will tend to draw the collet and center together. There is thus provided a means whereby the device may be adjusted in the event of the balls of ball races being worn.

In the operation of the device, the center is placed in position in the tail stock of a lathe and the work being properly placed is held in place by the live center and this center with a sufficient degree of pressure to cause a friction between the work and the centers to be greater than that between the center and the collet.

It is obvious that minor changes may be made in the form and construction of this device without departing from the material principles thereof. I do not, therefore, desire to confine myself to the exact form and proportion herein shown and described, but wish to include all such as properly come within the scope of my invention.

Having thus described the device, what is claimed as new is:—

1. In a device of the class described, a collet provided with a recess, a rotatable center having a shank seating in said recess, said shank being formed with an annular channel the walls of which are oppositely inclined and diverge outwardly, ball races formed in said collet and center, balls held in said ball races, and a set screw threaded through the collet and formed with a frusto-conical point lying within the channel and contacting with the innermost wall of the channel only whereby upon adjustment of the said screw, the center will be drawn inwardly with respect to the collet, the adjustment had being in one direction only.

2. In a device of the class described, a collet, a center having an adjustable bearing in the collet, anti-friction elements interposed between the opposed faces of the collet and center, and a guard ring carried by the center and extending over the meeting ends of the center and the collet and surrounding the said ends of the collet, the ring projecting considerably beyond the before mentioned face of the center whereby to retain the said anti-friction elements upon the said face while being assembled thereon.

In testimony that I claim the foregoing as my own, I have hereto affixed my signature in the presence of two witnesses.

CLARK S. TOTTEN.

Witnesses:
SCOTT L. JOHNSON,
GEORGE LEROY THOMPSON.